United States Patent [19]
[11] 3,904,836

Mohammadioun

[45] Sept. 9, 1975

[54] APPARATUS FOR PREFERENTIAL SELECTION AND SWITCHING OF PLURAL RECORDING MACHINES

[75] Inventor: Said Mohammadioun, Atlanta, Ga.

[73] Assignee: Lanier Electronic Laboratory, Inc., Atlanta, Ga.

[22] Filed: Feb. 1, 1973

[21] Appl. No.: 328,717

[52] U.S. Cl. ........ 179/100.1 DR; 179/6 R; 179/6 C

[51] Int. Cl. ...................... G11b 19/00; H04m 11/10

[58] Field of Search .......... 179/100.1 DR, 100.1 PS, 179/100.1 VC, 6 R, 6 E, 6 C

[56] References Cited

UNITED STATES PATENTS

| | | | |
|---|---|---|---|
| 3,328,536 | 6/1967 | Bolick, Jr. | 179/100.1 DR |
| 3,499,116 | 3/1970 | Jeske | 179/100.1 DR |
| 3,527,891 | 9/1970 | Johnston | 179/6 C |
| 3,671,680 | 6/1972 | Nye et al. | 179/100.1 DR |
| 3,712,961 | 1/1973 | Nye et al. | 179/100.1 DR |
| 3,721,774 | 3/1973 | Yonemoto et al. | 179/100.1 VC |

*Primary Examiner*—James W. Moffitt
*Assistant Examiner*—David K. Moore
*Attorney, Agent, or Firm*—Jones, Thomas & Askew

[57] ABSTRACT

Apparatus for providing automatic selection and interconnection between a dictate station and one of a plurality of dictation message recorders according to a predetermined schedule of preferential selection. A plurality of separate message recorders are provided for seizure and subsequent dictation recording by a remotely located dictate station, and the dictate station receives signals from the several message recorders corresponding to the availability of each message recorder for seizure. When a switch associated with the dictate station is operated to signify desired interconnection with a message recorder, sensing apparatus selects and seizes the first available message recorder according to a predetermined sequence of preference. A muting circuit associated with the dictate station prevents seizure of any message recorder until selection of the appropriate available message recorder is completed. If the first message recorder in the sequence of preference is available, selection of this first message recorder is accomplished without the necessity of control power, supplied to the dictate station.

23 Claims, 4 Drawing Figures

APPARATUS FOR PREFERENTIAL SELECTION AND SWITCHING OF PLURAL RECORDING MACHINES

This invention relates in general to dictation apparatus and in particular to apparatus providing a preferential selection of plural available dictation message recorders for interconnection with a dictate station.

Although numerous types of recording and playback apparatus designed and intended for recording and transcribing dictation or other messages are known in the art, much of the currently available dictation-transcription recording equipment can generally be divided into two categories: in the first, dictate and/or dictate-transcribe equipment in which the entire dictation and/or dictation-transcription apparatus, including the recording medium, the operating controls, and a microphone and audio reproducer, comprise a unitary structural arrangement which may be placed on the desk of a user, for example; in the second, remote or central dictation equipment of the type where the recording medium such as magnetic tape, belts, or the like, along with the associated message recording apparatus, are situated at a location remote from the locations where the dictation and/or transcription may occur. With respect to the second type of dictation apparatus, one or more dictate stations are typically provided at desks or other dictate locations, with each dictate station typically including a microphone, a second reproducer, and controls which are operative to select record, reverse, playback, and/or other operative modes of the remotely situated message recording apparatus. The central dictation message recording apparatus may include a recorder-transcriber employing an endless loop of magnetic tape as the recording medium, or may alternatively include a message recorder utilizing discrete recording media such as tape cassettes, belts, or the like, which are manually or automatically changed.

Since a number of separate dictate stations may be selectively connected to any one of a number of remote message recorders through the use of appropriate switching apparatus, dictation apparatus of the second type is frequently used in systems including a number of dictate stations and a number of message recorders. With systems of this type, it is frequently desirable to have each dictate station normally connected to a certain one of the message recorders so that the messages dictated from a particular dictate station is normally recorded on a certain one of the message recorders. If the certain message recorder is unavailable to receive further dictation, as will occur when the recording medium is completely filled or when the message recorder is already in use with another dictate station, it is desirable for the first dictate station to be automatically connected to the first available message recorder according to a predetermined order of preference.

The term "preferential selection" is used herein to describe the interconnection of a particular dictate station with one of a plurality of message recorders according to a preferred priority, with the dictate station always seizing the first message recorder which is available for seizure in a predetermined order of preferred seizure.

Techniques and apparatus are known in the art for attempting to accomplish preferential selection of one of a plurality of message recorders, with the simplest technique being merely a multiple-position selector switch used in conjunction with each dictate station so that the dictator can manually select the particular message recorder through manipulation of the switch. The disadvantages of a system requiring an overt act of the dictator are apparent, since the dictator may mistakenly commence dictation on a message recorder not preferentially assigned to him, as a result of his initial failure to properly position the manual selector switch.

An automatic preferential selection apparatus is shown in U.S. Pat. No. 3,328,536, and includes a dictate station having an electromechanical arrangement for accomplishing the desired preferential selection. While apparatus of the type disclosed in this patent provides the desired automatic preferential selection of an available recorder-transcriber, the switch wiper elements and other mechanical components associated with such apparatus present the potential problems of maintenance and repair generally associated with electromechanical devices.

Solid-state apparatus including a dictate station for selecting a particular message recorder from an available plurality of message recorders is shown, for example, U.S. Pat. No. 3,671,680. The dictate station therein disclosed requires a separate hook switch for each of the associated message recorders, and true preferential selection of the message recorders is obtainable only if the hook switches are moved to an off-hook position in the proper sequence.

Accordingly, it is an object of the present invention to provide improved preferential selection apparatus.

It is another object of the present invention to provide improved apparatus for preferential selection of plural message recorder apparatus.

It is still another object of the present invention to provide improved dictate station apparatus for selecting and seizing an available one of a plurality of message recorder apparatus according to a preferential sequence of selection.

Other objects and many of the attendant advantages of the present invention will become more readily apparent from the following description of an embodiment thereof, including the annexed drawing in which.

Stated in general terms, the present invention includes selecting apparatus which is operative to interconnect a dictate station with any one of a plurality of message recorders, sensing apparatus including a number of latch circuits which are connected to be responsive to signals indicating the availability status of the plural message recorders, and circuitry including a dictate station hook switch for causing the selecting apparatus to interconnect the dictate station and the first available message recorder in a predetermined order of preference. Muting circuitry blocks a seizure signal from being communicated from the hook switch to any message recorder until the aforementioned selection is completed. The selection apparatus normally passively connects a particular message recorder for seizure, if available, so that the selection and subsequent seizure can be accomplished in such a case without requiring switching power to be initially applied to the selection apparatus.

Figure 1:
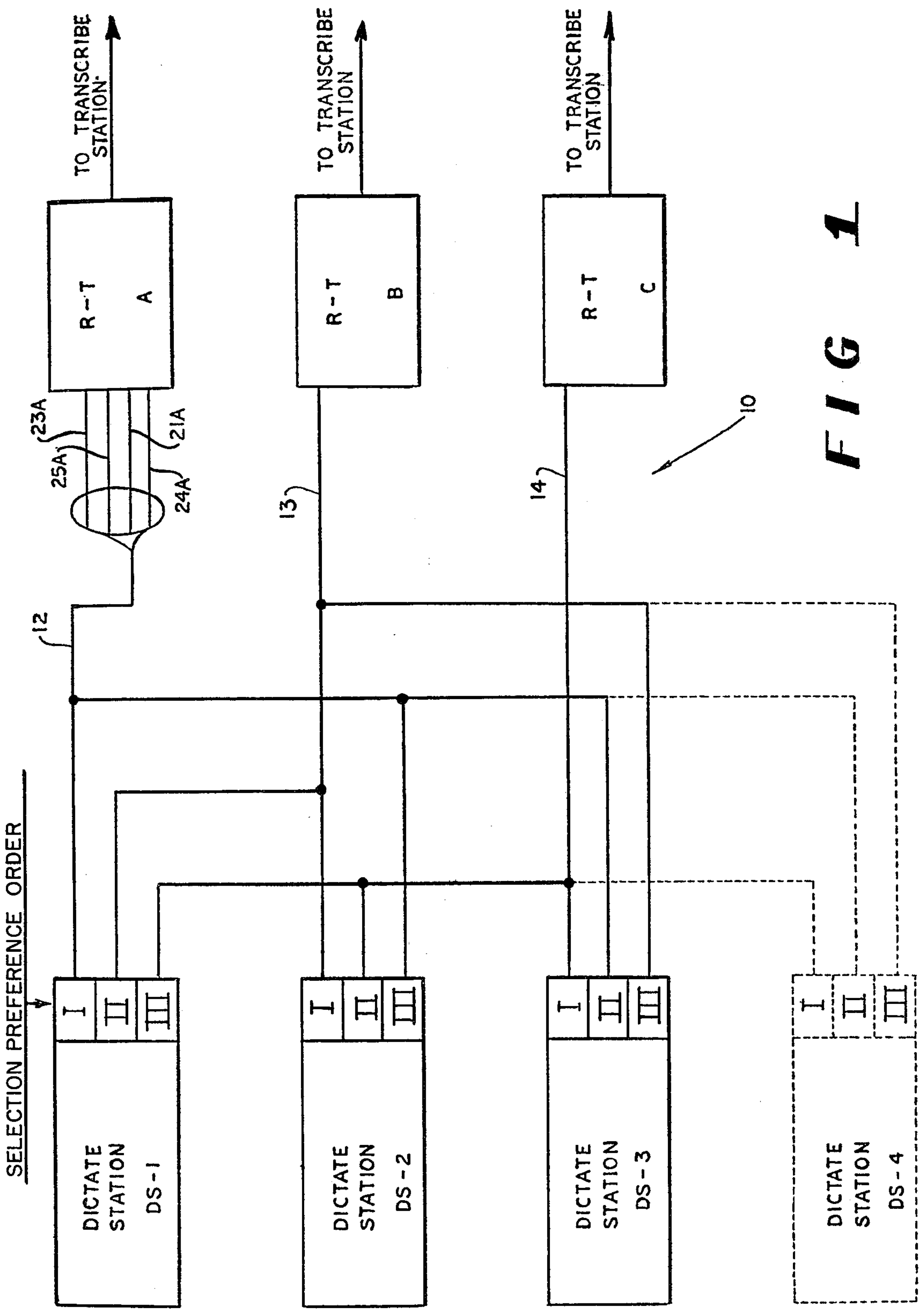
FIG. 1 is a block diagram showing an example of a dictation system utilizing a plurality of dictate stations and a plurality of message recorder-transcribers, according to the present invention.

Turning now to the disclosed embodiment of the present invention and with reference taken to FIG. 1, there is shown generally at 10 a typical example of a dictation-transcription system wherein a plurality of recorder-transcribers (R-T) A, B, and C, are provided for selective interconnection with a plurality of dictate stations DS-1, DS-2, and DS-3. Although the system 10 is shown having dictate stations equal in number to the recorder-transcribers, it will become apparent that this equality is not a requirement of the present invention and that the number of dictate stations, for example, can be greater or lesser than the number of recorder-transcribers. This fact is schematically represented in FIG. 1 by the dictate station DS-4 shown in phantom.

An exemplary recorder-transcriber intended for use in a remote dictation system requires four electrical connections with a dictate station to provide the necessary functions of seizure, availability signalling, two-way audio communication, and operational mode control of the tape or other recording medium. These four electrical conductors are designated 21A, 23A, 24A, and 25A for recorder-transcriber A, and are merged into a control cable indicated as line 12 for recorder-transcriber A. Recorder-transcribers B and C have similar control lines 13 and 14 interconnecting with the dictate stations. Although this disclosed embodiment of the invention is described in use with combined central recorder-transcriber apparatus, it will be apparent that the present invention can be used in combination with central message recorders which are not designed for transcription operation.

Each of the dictate stations according to the disclosed embodiment of the present invention has provision for connection with the lines of three separate recorder-transcribers, and these connections are schematically shown in FIG. 1 as a series of connecting points designated I, II, and III for each of the dictate stations. The logic circuitry within each dictate station is connected and functions in a manner set forth below to cause the dictate station to seize the recorder-transcriber connected to the connecting point I, if that recorder-transcriber is available for dictation. If the recorder-transcriber connected to the connecting point I is busy or otherwise unavailable, the dictate station will seize the recorder-transcriber connected to the connecting point II, if available, and if not, will seize the recorder-transcriber connected to the connecting point III, if available. Of course, if all of the connected recorder-transcribers are busy or otherwise unavailable, no seizure will occur. Since the preferential selection of each dictate station according to the present invention is manifested by preferential interconnection with the connecting points I, II, and III, it can be seen that each of the recorder-transcribers can be connected to receive priority interconnection with a particular one of the dictate stations. For example, recorder-transcriber A is connected through the line 12 to the connecting point I of the dictate station DS-1. The recorder-transcribers B and C are similarly connected to the respective connecting points I of the dictate stations DS-2 and DS-3. In this way, each of the three dictate stations will always seize a corresponding particular one of the three recorder-transcribers, assuming that these recorder-transcribers are available. A given dictate station will select and seize a second choice recorder-transcriber only if the recorder-transcriber connected to the connecting point I signals its unavailability.

Figure 2:
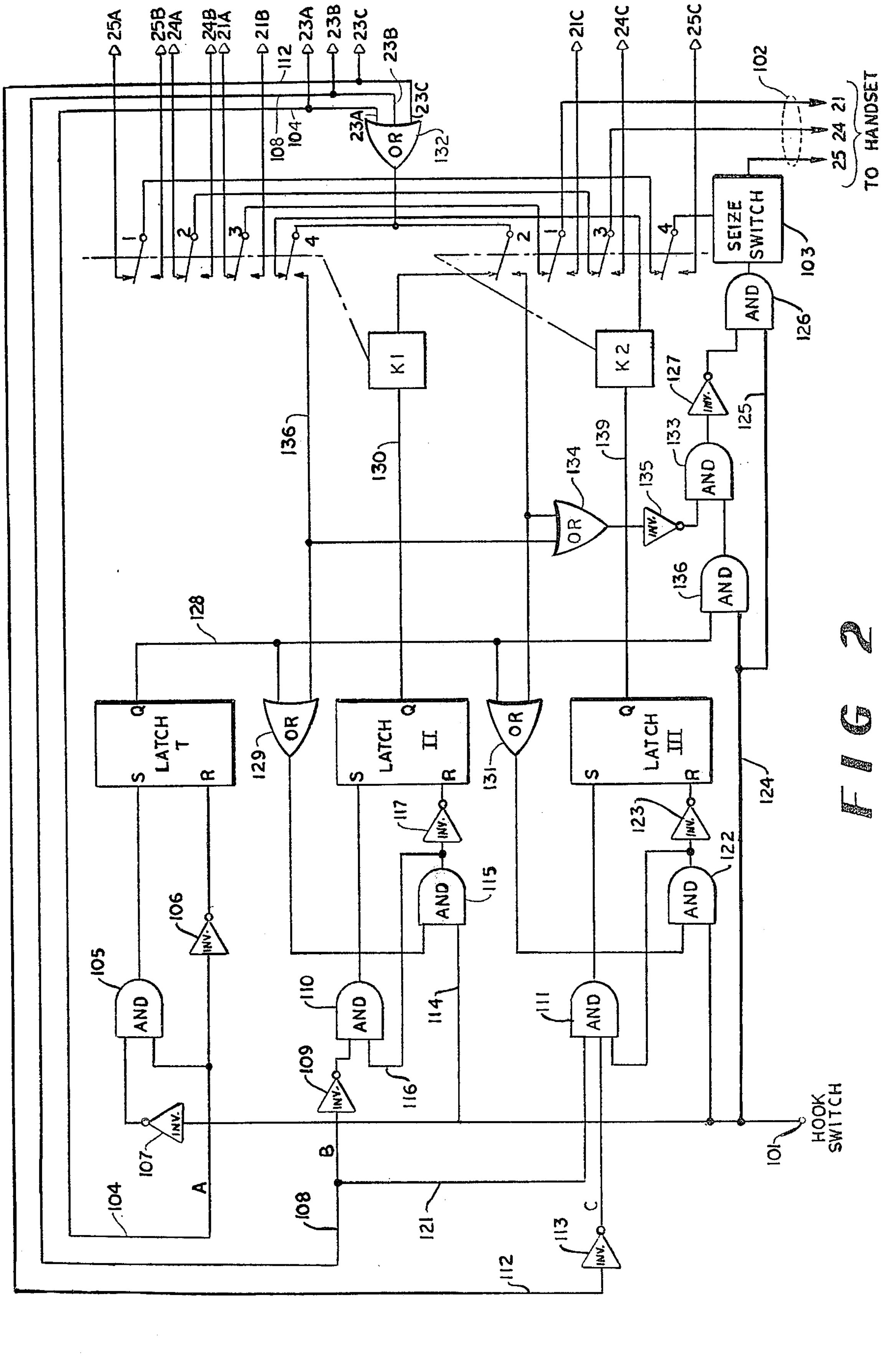
FIG. 2 is a schematic logic diagram showing the operational features of a disclosed embodiment of the present invention.

The structure and operation of the herein-disclosed embodiment of the present invention may be explained by referring to FIG. 2, in which conventional symbols and nomenclature are used to identify individual logic elements such as AND gates, OR gates, INVERT circuits, and the like. The "hook switch" terminal 101 is assumed to exhibit a logic "one" when the handset or other operating switch of the dictate station is off-hook, that is, in a state indicating desired selection and seizure of a recorder-transcriber, and exhibits a logic "zero" when the handset is on-hook, indicating relinquishment of a recorder-transcriber. The lines 21, 24, and 25, grouped at 102, symbolically represent three control lines which extend in the direction of the arrows for connection with the handset of the dictate station, and which are interconnected by the present apparatus with a particular selected recorder-transcriber. The control line 25 additionally passes through the seize switch 103, which becomes closed to permit seizure of a selected recorder-transcriber only after the operation of selection is completed.

The four conductors from each of the recorder-transcribers A, B, and C are designated 21, 23, 24, and 25, followed by the suffix A, B, or C denoting the particular recorder-transcriber. In a typical operating embodiment of recorder-transcribers, the control lines 21 represent an electrical ground or common line, the control lines 24 and 25 provide seizure signaling, operational mode control, and audio connection between the dictate station and the recorder-transcriber, and the lines 23 from the recorder-transcribers constitute availability status circuits presenting control signals indicating whether the recorder-transcriber is available for seizure and subsequent dictation. For example, the availability circuit 23A from the recorder-transcriber A may present little or no voltage to the dictate station, if the recorder-transcriber is available. If the recorder-transcriber A is unavailable, that fact is indicated by a signal of −24 volts applied to the circuit 23A by the recorder-transcriber A.

The apparatus shown in FIG. 2 includes a pair of multiple-pole selecting relays K1 and K2 interconnected with the control lines to the several recorder-transcribers A, B, and C; the recorder-transcriber A is interconnected with the grouped lines 102 when neither of the relays is energized, the recorder-transcriber B is interconnected with the grouped lines 102 when only relay K1 is energized, and the recorder-transcriber C is interconnected with the grouped lines 102 when only the relay K2 is energized. The operation of these two selecting relays is controlled by the three latches I, II, III; each of these three latches as shown in FIG. 2 may be provided by a conventional bistable flip-flop of the type known to the art.

The availability circuit 23A is connected through the line 104 to provide an input to the AND gate 105 and to the INVERT circuit 106, the output of which is connected to the reset input R of the latch I. The other input to the AND gate 105 is supplied from the hook switch terminal 101 through the INVERT circuit 107.

The availability circuit 23B is connected through the line 108 to the INVERT circuit 109, the output of which is supplied as an input to the AND gate 110. The availability circuit 23B is additionally connected to provide an input to the three-input AND gate 111. The availability circuit 23C is connected through the line 112 to the INVERT circuit 113, the output of which is connected as a second input to the AND gate 111.

Assuming that all of the recorder-transcribers are available and that an on-hook position of the hook switch maintains, the absence of a busy signal on the availability circuit 23A prevents the AND gate 105 from turning on. The absence of an input to the INVERT circuit 106 produces an output from that circuit as applied to the reset terminal R of the latch I, resulting in a "zero" output at Q thereof. The absence of a busy signal on the availability circuit 23B, as applied to the INVERT circuit 109, provides a "one" input to the AND gate 110. However, the absence of a "one" signal from the hool switch terminal 101, as applied along the line 114 to the AND gate 115, maintains at that gate a "zero" output which is applied along the line 116 to the AND gate 110. At the same time, the "zero" output is applied to the INVERT circuit 117 to provide a "one" signal applied to the reset terminal R of the latch II, thus producing a "zero" output at the terminal Q thereof.

The absence of a busy signal on the availability circuit 23B is also applied through the line 121 to an input of the AND 111, maintaining this gate at "zero" output. The "zero" signal presently at the hook switch terminal 101 is additionally applied to an input of the AND gate 122, providing a "zero" output which is applied as a second input to the AND gate 111. The INVERT circuit 123 applies a "one" signal to the reset input R of the latch III, causing the output Q thereof to exhibit a "zero" output. Accordingly, it can be seen that all of the three latches are turned off at this time.

If the hook switch is moved to an off-hook condition, signaling desired selection and seizure of a recorder-transcriber according to a preferential priority, a "one" signal appears at the hook switch terminal 101 and as applied through the INVERT circuit 107 to the AND gate 105, thereby maintaining a "zero" output from that gate. At the same time, the hook switch signal is applied along the lines 124 and 125 to an input of the AND gate 126. The other input of the AND gate 126 is receiving a "one" signal from the INVERT circuit 127, as described below, and so the AND gate 126 provides a "one" output which is applied to cause closure of the seize switch 103, establishing a circuit between the control line 25 in the handset circuit and the control line 25A connected to the recorder-transcriber A. This connection by the seize switch 103 enables seizure of the recorder-transcriber A to occur.

When recorder-transcriber A is seized, a busy signal equivalent to a logic "one" appears on the availability circuit 23A, turning off the output of the INVERT circuit 106 and thus removing a signal from the reset input R of the latch I. However, the remaining presence of a "zero" input from the INVERT circuit 107 to the AND gate 105 prevents the latch I from turning on at this time.

If the recorder-transcriber A was unavailable for seizure before the off-hook condition occurred, the existence of a busy signal on the availability circuit 23A would have removed the input to the reset input of the latch I and the presence of this busy signal, along with a "one" output from the INVERT circuit 107, would have supplied a "one" output from the AND gate 105 to the set input of the latch I, causing a "one" signal to appear at the output Q thereof. This "one" output as applied along the line 128 to the OR gate 129, provides a "one" input to the AND gate 115. However, the absence of a "one" input on the line 114 maintains the AND gate 115 off and a "one" input applied to the reset input of the latch II. Similarly, the OR gate 131 now provides a "one" input to the AND gate 122, but this gate remains off and the latch III continues to receive a "one" signal at its reset input.

As soon as a "one" signal appears on the hook switch terminal, both of the AND gates 115 and 122 turn on to cause removal of the "one" signals applied to the reset inputs of the latches II and III. The outputs from these two AND gates are also respectively applied to the AND gates 110 and 111. Assuming that both of the recorder-transcribers B and C are available at this time, the absence of a busy signal along the line 108 causes the INVERT circuit 109 to provide a "one" input to the AND gate 110, thus providing a set signal to turn on the latch II. The "one" signal appearing at the output Q of the latch II is applied along the line 130 to the actuating circuit of the relay K1, which is maintained ready for actuation by the busy signal applied from line 23A through the OR gate 132 and the relay terminal K2-2. The relay K1 is thus energized and the control circuits associated with the recorder-transcriber B are interconnected with the grouped lines 102.

The seize switch 103 has been maintained in open-circuit condition during the foregoing selection and operation of the relay K1 to prevent premature interconnection of the handset with the unavailable recorder-transcriber A. Since a "one" signal was present on the line 124 as soon as the off-hook condition occurred, this signal was applied as an input to the AND gate 126. The AND gate 136 is also turned on at this time to provide a "one" input to the AND gate 133. Since the OR gate 134 receives no "one" input at this time, the INVERT circuit 135 provides an additional "one" input to the AND gate 133, and the resulting "one" output applied to the INVERT circuit 127 provides a "zero" input to maintain the AND gate 126 off and thus to prevent the seize switch 103 from operating. As soon as the relay K1 has become energized, however, a signal is applied from the OR gate 132, through the relay contact K1-4 and along the line 136 to provide "one" signals to the OR gates 129 and 134. The resulting "one" output from the OR gate 134 turns the AND gate 133 off and permits the AND gate 126 to turn on, thus enabling the seize switch 103 to close only after the selection of recorder-transcriber B, the first preferentially-available one of the three recorder-transcribers, has been completed. The "one" applied to the OR gate 129 prevents the latch II from becoming reset in the event that the recorder-transcriber A becomes available and the "one" signal is removed from the line 128.

The "one" output is removed from the set gate S of the latch II as soon as a busy signal appears on the availability circuit 23B, but the "one" signal applied along the line 136 through the OR gate 129 maintains the AND gate 115 on to prevent the latch II from becoming reset. As soon as the hook switch becomes on-hook, however, the "one" signal is removed from the line 114 and the AND gate 115 turns off to cause the latch II to be reset to its "off" state.

Consider next the case where only the recorder-transcriber C was available for seizure immediately before the off-hook condition prevailed. From the foregoing discussion, it can be seen that the latch I is on and the latches II and III are off at this time. Moreover, the presence of a busy signal from the recorder-transcriber B as applied to the INVERT circuit 109 prevents the AND gate 110 from turning on to set the latch II. The AND gate 111 is receiving a "one" input on two of its three inputs at this time, namely, along the line 121 and from the output of the INVERT circuit 113. As soon as off-hook occurs, the "one" input applied to the AND gate 122 combined with the other "one" input already present at that gate from the OR gate 131 provides the third "one" input to the AND gate 111 and causes the latch III to be set to its Q state. A "one" signal is applied along the line 139 to cause the relay K2 to be energized, this relay receiving an actuation power source by the busy signal supplied through the deenergized terminal 4 of the relay K1. The seize switch 103 is prevented from closing at this time as aforementioned.

As soon as the relay K2 is energized to interconnect the control lines 21C, 24C, and 25C with the grouped lines 102, a "one" signal applied through the contact K2-2 and the OR gate 134 causes the AND gate 126 to turn on to close the seize switch 103. The "one" signal is also applied to the OR gate 131 to prevent the latch III from becoming reset in the event that the recorder-transcriber A becomes available and the "one" signal is removed from the line 128.

As soon as an on-hook condition occurs, the AND gate 122 turns off and the latch III becomes reset.

If all of the recorder-transcribers are unavailable at the time the off-hook condition occurred, the presence of a busy signal at the input to the INVERT circuit 113 would have prevented the AND 111 from turning on. Thus, neither of the relays K1 or K2 could become energized and the AND gate 126 would remain off to prevent the seize switch 103 from closing. The handset circuit thus cannot be interconnected with any of the busy recorder-transcribers.

A disclosed embodiment of the present invention is described in further detail according to the schematic circuit depicted in FIGS. 3A and 3B, wherein the logic functions described with reference to FIG. 2 will be seen to be present.

Figure 3B:
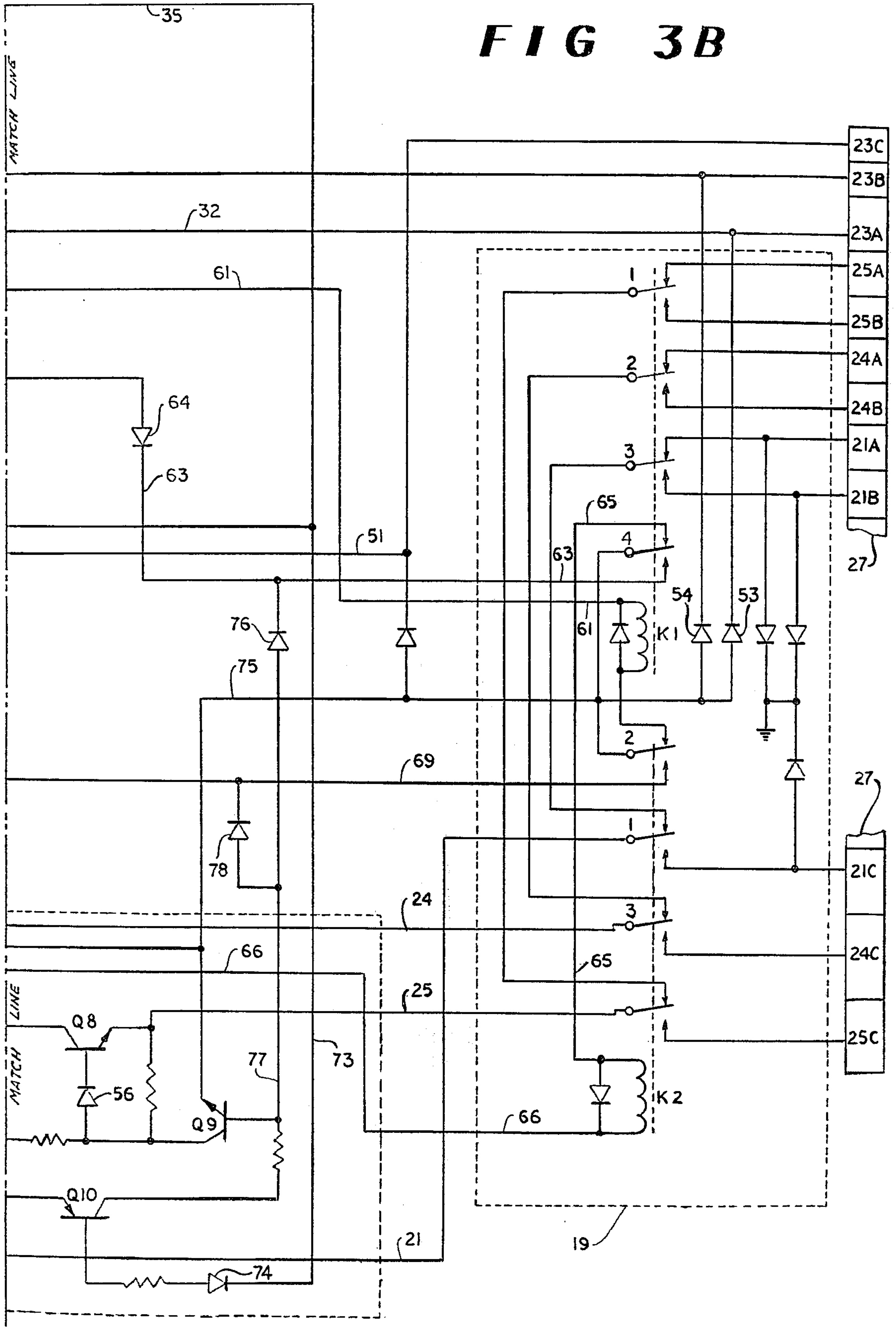
FIGS. 3A and 3B are complementary portions of a schematic wiring diagram showing circuitry according to a disclosed embodiment of the present invention.
Figure 3A:
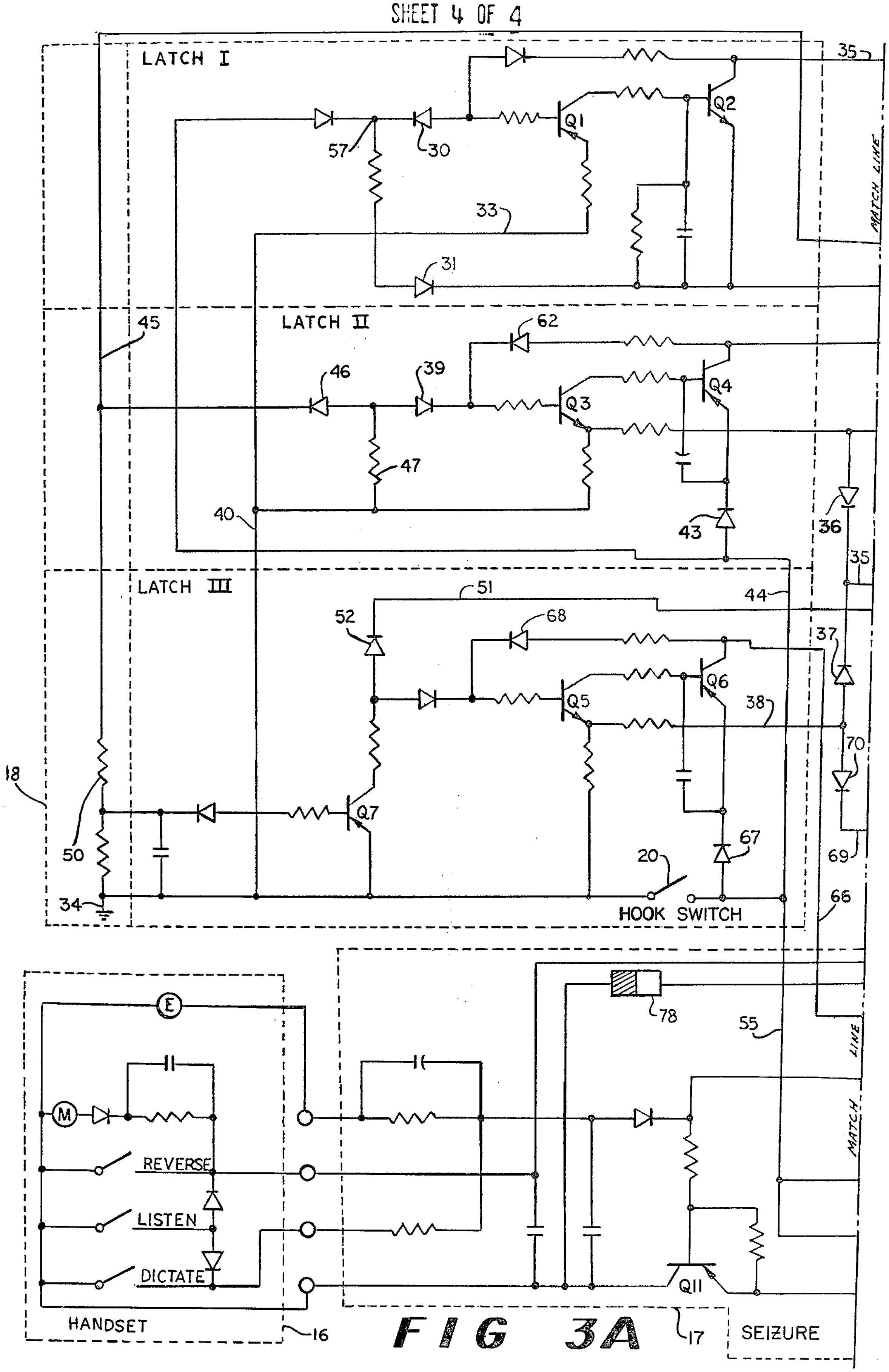

All of the dictate stations shown in FIG. 1 are preferably identical to each other, with a typical one of the dictate stations according to the disclosed embodiment of the present invention being detailed in FIGS. 3A and 3B. Various portions of the dictate stations are separately designated and identified in FIGS. 3A and 3B for convenience of description, but it will be appreciated that all of the structure shown and described in those Figures typically may be contained in a telephone-like structure including a handset section schematically shown at 16 and a handset-receiving base portion containing the seizure section 17, the preference logic section 18, the line selecting section 19, and a hook switch 20 positioned to be controlled by placement of the handset on the base housing. The hook switch 20 is of the normally-closed type and is depicted in FIG. 3A as maintained open by an "on-hook" placement of the handset.

The line selecting section 19 includes the aforementioned pair of four-pole relays K1 and K2, and it can be seen that the three control conductors 21, 24, and 25 of the recorder-transcribers A and B are connected through the terminal strip 27 to be selectively switched through the terminals 1, 2, and 3 of the relay K1. The corresponding conductors 21, 24, and 25 of the recorder-transcriber C are connected to the terminals 1, 3, and 4 of the relay K2. The relays K1 and K2 are selectively operated as aforementioned to interconnect recorder-transcriber A, B, or C to the seizure section 17 and the handset 16. The availability circuits 23A, 23B, and 23C bypass the selecting section 19 and are directly connected to the preference logic section 18 as described below to effect the appropriate operation of the relays K1 and K2 by the selecting section 19.

The transistors Q8 and Q11 in the seizure section 17 normally maintain an open-circuit condition on the lines 25 and 21, thereby preventing any seizure or other possible connection between the handset section 16 and any of the recorder-transcribers until Q8 and Q11 become conductive. The handset section 16 may be conventional to the dictation-transcription art and typically includes a microphone M, an earphone or speaker E, and switches which selectively ground either or both of the control lines 24 and 25 to select various recorder-transcriber operational modes such as reverse, forward-listen, and forward-dictate.

Preference Logic Section

The preference logic section 18, which controls the operation of the selection relays K1 and K2 to establish interconnection and seizure of a particular recorder-transcriber according to a predetermined preference priority, includes three latch sections which are designated "latch I," "latch II," and "latch III."

These three latch circuits operate in a selective manner, in response to the presence of busy signals on the several availability circuits 23A, 23B, and 23C, to place the hook switch 20 in appropriate circuit relationships to cause either one or the other of the relays K1 and K2, or neither of such relays, to be energized for selecting the appropriate recorder-transcriber. A muting circuit contained in the seizure section 17 is also operative in response to circuit conditions at the control of the hook switch 20 and the presence of busy signals on the availability circuits to keep Q8 and Q11 nonconductive until selection and seizure of a recorder-transcriber is accomplished.

Latch I includes a transistor Q1 having a base circuit connected through the diodes 30 and 31 and the line 32 to the availability circuit 23A of the recorder-transcriber A. So long as the recorder-transcriber A remains available for seizure and subsequent dictation, the voltage applied to the transistor Q1 from the availability circuit 23A, is zero, or at least less than the minimum amount of voltage required to place Q1 in a conductive state by way of the circuit completed through the lines 33 and 40 to ground at 34. If the recorder-transcriber A is unavailable for seizure by this dictate station, because of previous seizure by another dictate station or for another reason, −24v is applied from the terminal 23A to turn on the transistor Q1 and additionally to turn on the switch including the transistor Q2. When Q2 is turned on, the −24v from the terminal 23A is applied through Q2 to the line 35 and the diode 36 to the transistor Q3 of the latch II. At the same time, –24v is applied through the diode 37 and the line 38 to the transistor Q5 of the latch III.

Assuming that the recorder-transcriber A remains unavailable and that the hook switch 20 remains in its on-hook or open-circuit condition, the transistor Q3 of the latch II is turned on by the –24v applied through the diode 36, the diode 39, and the line 40 to the ground connection 34. The switch transistor Q4 remains turned off at this time, however, since the ground circuit through the diode 43 and the line 44 to ground at 34 is broken by the open hook switch 20, and so the latch II remains turned off. If the recorder-transcriber B was unavailable at the time the –24v signal was applied along the line 35 from the latch I to the latch II, as shown by the presence of a –24v signal on the availability circuit 23B, the presence of this –24v signal applied through the line 45, the diode 46, and the resistance 47 maintains the transistor Q3 in a nonconductive state notwithstanding the –24v signal applied to the latch II from the latch I. Similarly, if the transistor Q3 was already rendered conductive by the signal from the latch I, a subsequent occurrence of the –24v busy signal on the availability circuit 23B causes the transistor Q3 to be turned off.

Considering next the latch III, this latch also includes a pair of switching transistors, designated Q5 and Q6, with Q5 receiving a –24v signal from the latch I as aforementioned when the latch I is turned on by the presence of a busy signal on the availability circuit 23A. Assuming that the recorder-transcriber B is also busy, the –24v signal occurring on the availability circuit 23B and applied along the line 45 through the resistance 50 turns on the "enable" transistor Q7, thereby establishing a circuit from the base of the transistor Q5 to ground and permitting Q5 to conduct. The transistor Q6 remains nonconductive at this time, however, since the hook switch 20 remains open, and so the latch III remains off. If the recorder-transcriber C is also busy as shown by a –24v signal presence on the availability circuit 23C, this busy signal is applied through the line 51 and the diode 52 to turn off Q5.

Turning to the operation of the preference logic as described thus far, consider first the case where all three of the recorder-transcribers A, B, and C are available. All of the latches I, II, and III remain off at this time, since no operating voltage is applied on any of the availability circuits. For the same reason, neither of the relays K1 or K2 can be energized since the relays require operating voltage supplied from at least one of the availability circuits 23A-23C through the relay contact K2-2, and since the relay K2 requires operating power supplied from one of the availability circuits through the relay contact K1-4. Accordingly, both of the relays K1 and K2 are deenergized and the control lines 21A, 24A, and 25A of the recorder-transcriber A are connected through the contacts of the relays K1 and K2 and the lines 21, 24, and 25 to the seizure section 17.

When the hook switch 20 is closed under the foregoing conditions, the ground connection 34 is applied through the hook switch 20, the line 55, and the diode 56 to the seize switch Q8, which is connected through the line 25, the relay contact K2-4, and the relay contact K1-1 to the control line 23A. A control voltage applied to this line from the recorder-transcriber A now flows to ground 34 to turn on the seize switch Q8, and thus Q8 and Q11 are both turned on to establish an operating circuit along the lines 21 and 25, through the seizure section 17, and to the handset section 16. The current now flowing along the control line 25A causes the recorder-transcriber A to be seized, and this seized recorder-transcriber places a busy signal of –24v on the availability circuit 23A. This busy signal has no effect on the latch I, however, since the now-closed hook switch 20 places ground potential on the point 57 of the Q1 base circuit. The preferentially-selected recorder-transcriber A remains seized by this dictate station until the hook switch 20 is opened to break the circuit through the seize switch Q8.

If the recorder-transcriber A had been unavailable at the time the hook switch 20 was closed, the busy signal existing on the availability circuit 23A would have turned latch I on to apply –24v through the line 35 and the diode 36 to turn on the transistor Q3 of the latch II (assuming that the recorder-transcriber B was not busy at this time). When the hook switch 20 closes, a circuit is completed through the diode 43, the line 44, and the hook switch 20 to turn on the transistor Q4, thus turning on the latch II. An operating circuit for the relay K1 is now completed to permit current to flow from the availability circuit 23A, the diode 53, the deenergized relay contact K2-2, the coil of the relay K1, and the line 61 to ground through the conducting transistor Q4, thereby energizing the relay K1 and connecting the control circuits 21B, 24B, and 25B to the lines 21, 24, and 25 of the seizure section 17. Seizure occurs as aforementioned, causing a –24v busy signal to appear on the availability circuit 23B and this busy signal is applied along the line 45 to the latch II. However, the latch II remains turned on at this time by way of a hold circuit including the diode 62 and the transistor Q4. The latch II is unaffected by subsequent removel of the voltage from the line 35 and the latch I, resulting from recorder-transcriber A becoming available, since a –24v hold signal is applied through the contact K1-4, the line 63, and the diode 64 to maintain the latch II turned on. The recorder-transcriber B is thus preferentially selected because of the unavailability of the recorder-transcriber A, and remains seized until the hook switch 20 is opened.

Assume next that both recorder-transcribers A and B are unavailable at the time the hook switch 20 is closed. As mentioned above, the latch I is turned on at this time and the latch II is disabled by the presence of the busy signal applied along the line 45 from the availability circuit 23B. The enable transistor Q7 and the transistor Q5 are both turned on at this time. As soon as the hook switch 20 is closed, the transistor Q6 is turned on and the coil of the relay K2 is energized through a circuit including the voltage present on availability circuits 23A and 23B, the diode 53, the contact K1-4 of the deenergized relay K1, the line 65, the coil of the relay K2, the line 66, the conductive transistor Q6, the diode 67, and the closed hook switch 20. The relay K2 is now energized to interconnect the control lines 21C, 24C, and 25C with the seizure section 17. The relay K1 remains deenergized at this time because the latch II including the transistor Q4, remains turned off. As soon as seizure of the now-connected recorder-transcriber C occurs, a –24v busy signal appears on the availability circuit 23C of that recorder-transcriber. This busy signal does not affect the operation of the latch III, however, because of the hold circuit including the diode 68 interconnected between the transistors Q5 and Q6.

Moreover, removal of the busy signal from the availability circuit 23B does not affect the operation of the latch III, since a —24v hold signal is applied through the now-closed contact K2-2, the line 69, and the diode 70 to maintain the operation of the latch III.

In the case where all three of the recorder-transcribers are busy or otherwise unavailable at the time the hook switch 20 is closed, the latch I is turned on and the latches II and III are disabled by the respective busy signal present on the availability circuits 23B and 23C, as aforementioned. Since neither of the latches II and III is turned on, the now-closed hook switch 20 is unable to complete an operating circuit for either of the relays K1 or K2. The recorder-transcriber A thus remains connected through the deenergized relays K1 and K2 to the seizure circuit 17, but seizure or other interconnection between the recorder-transcriber A and the handset section 16 is prevented by a muting circuit described below.

Muting Circuit

When either of the recorder-transcribers B or C is selected as described above, a brief amount of time is required from the moment that the hook switch 20 is closed until the relay K1 or K2 is energized to select the appropriate recorder-transcriber. It is important that the seize switch Q8 remains off during this amount of time to prevent any possible interconnection between the handset section 16 and any of the recorder-transcribers, and also to prevent possible inadvertent momentary connection of the dictate station with a recorder-transcriber already in use. This is accomplished through muting circuitry contained in the seizure section 17 and including the transistors Q9 and Q10 which function to prevent the seize switch Q8 from being turned on under certain conditions.

For example, assume that recorder-transcriber A is unavailable for seizure when the hook switch 20 is closed, requiring the line selecting section 19 and the preference logic section 18 to select either the recorder-transcriber B or, if B is unavailable, C. As soon as the hook switch 20 is closed, the —24v signal applied to the line 35 by the turned-on latch I is applied through the line 73 and the diode 74 to turn on the transistor Q10. Ground potential is thus applied to the base of the transistor Q9, permitting Q9 to be turned on by the —24v present on the line 75 and derived from the busy signal present on at least one of the availability circuits 23A and 23B. The —24v signal is thus applied to maintain the seize switch Q8 turned off, thereby preventing any possible seizure or other interconnection between the seizure section 17 and the recorder-transcriber A which remains connected to the seizure section for the short period of time required for the relay K1 or K2 to close. Assuming that the relay K1 has closed to select the recorder-transcriber B, — 24v is applied through the relay contact K1-4, the line 63, the diode 76, and the line 77 to turn the transistor Q9 off. The —24v signal previously applied to the seize switch Q8 is now removed, permitting this switch to become conductive to initiate seizure of the selected recorder-transcriber in the manner described above. Alternatively, if the recorder-transcriber C had been selected by energizing the relay K2, —24v applied through the contact K2-2, the line 69, and the diode 78 turns the transistor Q9 off to terminate the muting function and permit seizure to occur.

If none of the recorder-transcribers is available, closure of the hook switch 20 causes the transistors Q10 and Q9 to turn on and to prevent the seize switch Q8 from operating, as described above. Since neither K1 nor K2 can be energized, all of the recorder-transcribers being unavailable, the transistors Q9 and Q10 remain on until one of the recorder-transcribers becomes available (or until the hook switch 20 is opened), maintaining the seize switch Q8 off and keeping the dictate station muted.

In the event that the recorder-transcriber A is available when the hook switch 20 is closed, the latch I remains turned off and no —24v signal is applied along the lines 35 and 73 to the muting circuit. The seize switch Q8 is thus closed to permit seizure to occur.

It will be seen from the foregoing that a dictate station has been disclosed which provides automatic preferential selection of an available message recorder according to a predetermined sequence of preference. If all of the message recorders are available for seizure, the first-preferred message recorder is connected for seizure without requiring any switching action, thus permitting the preferential selection circuit to operate at a time when no external power is available at the dictate station to operate a switching relay. The only control required to provide the preferential selection is the single hook switch 20. A suitable indicating device 78, such as a flag meter or an indicator lamp, may be included to indicate that the dictate station is operationally connected to a recorder-transcriber.

It is apparent that the foregoing relates only to a preferred embodiment of the present invention, and that numerous alterations and modifications may be made therein without departing from the spirit and the scope of the invention as set forth in the following claims.

What is claimed is:

1. Apparatus for providing a preferential order of interconnection between the dictation circuit of a dictate station and one of a plurality of message recording units each of which produces a busy signal condition when unavailable for message receiving service, comprising:

switch apparatus having a first switching condition interconnecting a first one of said message recording units to the dictation circuit and having at least one other switching condition interconnecting another message recording unit to the dictation circuit, said switch apparatus normally operative in the absence of a first switching signal to maintain said first switching condition and being operative in response to a first switching signal to assume said other switching condition;

control switch means associated with the dictate station and selectively operative to produce a control signal indicating desired interconnection between the dictate station and one of the plurality of message recording units; and control circuit means connected to receive said control signal and also to receive a busy signal condition produced by said first message recording unit, said control circuit means operative in response to said control signal from said control switch means to apply said busy signal condition to said switch apparatus to provide said first switching signal to operate said switch apparatus to said other switching condition, so that a busy signal produced by the first message recording unit provides selective operation of said switch apparatus.

2. Apparatus as in claim 1, wherein:

said control circuit means is operative in response to the presence of said busy signal condition from said first message recording unit when the control signal is received to apply said busy signal condition to said switch apparatus as said first switching signal.

3. Apparatus as in claim 1, further comprising:

muting circuit means disposed in circuit between the dictation circuit and said switch apparatus, said muting circuit means selectively operative to a first condition preventing passage of signals between the dictation circuit and said switch means and to a second condition permitting such passage of signals;

muting control means operatively connected to selectively place said muting circuit means in either of said first and second conditions, said muting control means connected to receive said control signal and also said busy signal condition from said first message recording unit and operative in response to the absence of said control signal to place said muting circuit means in said first condition, said muting control means operative in response to the presence of said control signal and the absence of said busy signal condition from said first message recording unit to place said muting circuit means in said second condition, and said muting control means operative in response to the presence of said busy signal condition from said first message recording unit at the time a control signal is received to maintain said muting circuit means in said first condition.

4. Apparatus as in claim 3, wherein:

said muting control means is connected to receive a signal indicating the assumption of said other switching position by said switching apparatus and is operative in response thereto to place said muting circuit means in said second condition.

5. Apparatus as in claim 1, wherein:

said switch apparatus has said first switching condition and additionally has second and third switching conditions, said second switching condition interconnecting a second one of said message recording units to the dictation circuit and said third switching condition interconnecting a third one of said message recording units to the dictation circuits;

said switch apparatus normally operative to maintain said first switching condition and being selectively operative in response to said first switching signal to assume said second switching condition and being further selectively operative in response to a second switching signal to assume said third switching condition;

said control circuit means being connected to receive said control signal from said control switch means and said busy signal conditions from each of said first, second, and third message recording units, said control circuit means being operative in response to the presence of a first busy signal condition from said first message recording unit at a time when said control signal is received to apply said first busy signal condition to said switch apparatus to provide said first switching signal, to operate said switch apparatus to said second switching condition; and said control circuit means being operative in response to the presence of a busy signal condition from both of said first and second message recording units at a time when a control signal is received to apply one of said busy signal conditions to said switch apparatus to provide said second switching signal to operate said switch apparatus to said third switching condition.

6. Apparatus as claim 5, further comprising:

muting circuit means disposed in circuit between the dictation circuit and said switch apparatus, said muting circuit means selectively operative to a first condition preventing passage of signals between the dictation circuit and said switch means and to a second condition permitting such passage of signals;

muting control means operatively connected to selectively place said muting circuit means in either of said first or second conditions, said muting control means connected to receive said control signal and also said busy signal condition from said first message recording unit and operative in response to the absence of said control signal to place said muting circuit means in said first condition, said muting control means operative in response to the presence of said control signal and the absence of a busy signal condition from said first message recording unit to place said muting circuit means in said second condition.

7. Apparatus as in claim 6, wherein:

said muting control means is operative in response to the presence of a busy signal condition from said first message recording unit at the time said control signal is received to maintain said muting circuit means in said first condition; and said muting control means is connected to receive a first signal from said switching apparatus indicating the assumption of said second switching position and to receive a second signal from said switching apparatus indicating the assumption of said third switching position, said muting control means being operative in response to the presence of said control signal and the occurrence of either of said first and second signals from said switching apparatus to place said muting circuit means in said second condition.

8. Apparatus as in claim 5, wherein:

said control circuit means comprises first, second, and third status circuits;

said first status circuit being connected to receive said control signal and a busy signal condition from said first message recording unit and operative in response to the presence of a busy signal condition from said first message recording unit and the absence of said control signal to apply a first priority signal condition to said second and third status circuits;

said second status circuit operative in response to said first priority signal condition to assume a first priority selection state and further operative when in said first priority selection state and in response to said control signal to apply said first busy signal condition as said first switching signal to said switch apparatus;

said second status circuit being further operative in response to a busy signal condition from said second message recording unit at the time when said control signal is received to abstain from said priority selection state;

said third status circuit connected to receive said first priority signal condition and the busy signal conditions from said second and third message recording units and operative in response to the concurrent presence of said first priority signal condition from said first status circuit and a busy signal condition from said second message recording unit to assume a second priority selection state, said third status circuit when in said second priority selection state being operative in response to said control signal to apply said busy signal condition from said second message recording unit as said second switching signal to said switch apparatus;

said third status circuit being additionally operative in response to a busy signal condition from said third message recording unit to abstain from said second priority selection state.

9. Apparatus as in claim 8, further comprising:

muting circuit means disposed in circuit between the dictation circuit and said switch apparatus, said muting circuit means selectively operative to a first condition preventing passage of signals between the dictation circuit and said switch means and to a second condition permitting such passage of signals;

muting control means operatively connected to selectively place said muting circuit means in either of said first or second conditions, said muting control means being connected to receive said control signal, said first priority signal condition, and signals from said switching apparatus indicating the assumption of either of said second and third switching positions, said muting control means being operative in the absence of said control signal to place said muting circuit means in said first condition, said muting control means being additionally operative in response to the concurrent presence of said control signal and said priority signal to maintain said muting circuit means in said first condition until a signal is received from said switching apparatus indicating the assumption by said switching apparatus of either of said second and third switching positions.

10. Dictation system for providing a preferential order of interconnection between the dictation circuit of a dictate station and one of a plurality of message recording units each of which produces a busy signal condition when unavailable for message receiving service, comprising:

a dictate station including at least one dictation circuit for communicating with a message recording unit;

a plurality of message receiving units remotely situated from said dictate station;

switch apparatus connected in circuit between said dictation circuit and each of said message receiving units, said switch apparatus having a first switching condition interconnecting a first one of said message recording units to said dictation circuit and having at least one other switching condition interconnecting another of said message recording units to said dictation circuit, said switch apparatus normally operative to maintain said first switching condition and being operative in response to a first switching signal to assume said other switching condition;

control switch means associated with said dictate station and selectively operative to produce a control signal indicating desired interconnection between said dictation circuit and one of said message recording units in a predetermined order of preference; and control circuit means connected to receive said control signal and also to receive a busy signal condition from said first message recording unit, said control circuit means operative in response to said control signal from said control switch means to apply said busy signal to said switch apparatus to provide said first switching signal to operate said switch apparatus to said other switching condition.

11. The system as in claim 10, further comprising:

muting circuit means disposed in circuit between said dictation circuit and said switch apparatus, said muting circuit means selectively operative to a first condition preventing passage of signals between said dictation circuit and said switch means and to a second condition permitting such passage of signals;

muting control means operatively connected to selectively place said muting circuit means in either of said first and second conditions, said muting control means connected to receive said control signal and the busy signal condition from said first message recording unit and operative in response to the absence of said control signal to place said muting circuit means in said first condition, said muting control means additionally operative in response to the presence of said control signal and the concurrent absence of said busy signal condition from said first message recording unit to place said muting circuit means in said second condition, and said muting control means additionally operative in response to the presence of said busy signal condition from said first message recording unit at the time said control signal is received to maintain said muting circuit means in said first condition;

said muting control means being connected to receive a signal from said switch apparatus indicating the assumption of said other switching position and being operative in response thereto to place said muting circuit means in said second condition.

12. The system as in claim 10, wherein:

said switch apparatus has said first switching condition and additionally has second and third switching conditions, said second switching condition interconnecting a second one of said message recording units to the dictation circuit and said third switching condition interconnecting a third one of said message recording units to the dictation circuits, said switch apparatus normally operative to maintain said first switching condition and being selectively operative in response to said first switching signal to assume said second switching condition and being further selectively operative in response to a second switching signal to assume said third switching condition;

said control circuit means being connected to receive said control signal from said control switch means and said busy signal conditions from each of said first, second, and third message recording units, said control circuit means being operative in response to the presence of a first busy signal condition from said first message recording unit when said control signal is received to apply said first busy signal condition to said switch apparatus to provide said first switching signal, to operate said switch apparatus to said second switching condition; and said control circuit means being operative in response to the presence of a busy signal condition from both of said first and second message recording units when a control signal is received to apply one of said busy signal conditions to said switch apparatus to provide said second switching signal to operate said switch apparatus to said third switching condition.

13. The system as in claim 12, further comprising:

muting circuit means disposed in circuit between said dictation circuit and said switch apparatus, said muting circuit means selectively operative to a first condition preventing passage of signals between the dictation circuit and said switch means and to a second condition permitting such passage of signals;

muting control means operatively connected to selectively place said muting circuit means in either of said first or second conditions, said muting control means connected to receive said control signal and also said busy signal condition from said first message recording unit and operative in response to the absence of said control signal to place said muting circuit means in said first condition, said muting control means operative in response to the presence of said control signal and the absence of a busy signal condition from said first message recording unit to place said muting circuit means in said second condition.

14. The system as in claim 13, wherein:

said muting control means is operative in response to the presence of a busy signal condition from said first message recording unit at the time said control signal is received to maintain said muting circuit means in said first condition; and said muting control means is connected to receive a first signal from said switching apparatus indicating the assumption of said second switching position and to receive a second signal from said switching apparatus indicating the assumption of said third switching position, said muting control means being operative in response to the presence of said control signal and the occurrence of either of said first and second signals from said switching apparatus to place said muting circuit means in said second condition.

15. The system as in claim 12, wherein:

said control circuit means comprises first, second, and third status circuits;

said first status circuit being connected to receive said control signal and a busy signal condition from said first message recording unit and operative in response to the presence of a busy signal condition from said first message recording unit and the absence of said control signal to apply a first priority signal condition to said second and third status circuits;

said second status circuit operative in response to said first priority signal condition to assume a first priority selection state and further operative when in said first priority selection state and in response to said control signal to apply said first message recording unit busy signal as said first switching signal to said switch apparatus;

said second status circuit being further operative in response to a busy signal condition from said second message recording unit at the time when said control signal is received to abstain from said priority selection state;

said third status circuit connected to receive said first priority signal condition and the busy signal conditions from said second and third message recording units and operative in response to the concurrent presence of said first priority signal condition from said first status circuit and a busy signal condition from said second message recording unit to assume a second priority selection state, said third status circuit when in said second priority selection state being operative in response to said control signal to apply a busy signal from either said first or second message recording unit as said second switching signal to said switch apparatus;

said third status circuit being additionally operative in response to a busy signal condition from said third message recording unit to abstain from said second priority selection state.

16. The system as in claim 15, further comprising:

muting circuit means disposed in circuit between said dictation circuit said switch apparatus, said muting circuit means selectively operative to a first condition preventing passage of signals between the dictation circuit and said switch means and to a second condition permitting such passage of signals;

muting control means operatively connected to selectively place said muting circuit means in either of said first or second conditions, said muting control means being connected to receive said control signal, said first priority signal conditions, and signals from said switching apparatus indicating the assumption of either of said second and third switching positions, said muting control means being operative in the absence of said control signal to place said muting circuit means in said first condition, said muting control means being additionally operative in response to the concurrent presence of said control signal and said priority signal to maintain said muting circuit means in said first condition until a signal is received from said switching apparatus indicating the assumption by said switching apparatus of either of said second and third switching positions.

17. Dictate station apparatus for providing a preferential order of interconnection with one of a plurality of message recording units each of which provides a busy signal condition when unavailable for message receiving service, comprising:

a dictation circuit for interconnection with a message recording unit;

switch apparatus having a first switching condition interconnecting said dictation circuit to first circuit terminals correspondng to a first message receiving unit and having at least one other switching condition interconnecting said dictation circuit with second circuit terminals corresponding to another message recording unit, said switch apparatus normally operative to maintain said first switching condition and being operative in response to a first switching signal to assume said other switching condition;

control switch means selectively operative to provide a control signal dictating desired interconnection between the dictate station and said first circuit terminals corresponding to said first message recording unit;

control circuit means connected to receive said control signal and operative in response to the presence of a busy signal condition at said first circuit terminals at the time when said control signal is received to apply said busy signal condition to said switch apparatus to provide said first switching signal to operate said switch apparatus to said other switching condition.

18. Dictate station apparatus as in claim 17, further comprising:

muting circuit means disposed in circuit between said dictation circuit and said switch apparatus, said muting circuit means selectively operative to a first condition preventing passage of signals between said dictation circuit and said switch means and to a second condition permitting said passage of signals;

muting control means operatively connected to selectively place said muting circuit means in either of said first and second conditions, said muting control means connected to receive said control signal and also said busy signal condition applied from said first message recording unit and operative in response to the absence of said control signal to place said muting circuit means in said first condition, said muting control means additionally operative in response to the presence of said control signal and the absence of said busy signal condition at said first circuit terminals to place said muting circuit means in said second condition, said muting control means additionally operative in response to the presence of a busy signal condition at said first circuit terminals at the time said control signal is received to maintain said muting circuit means in said first condition; and said muting control means being connected to receive a signal from said switching apparatus indicating the assumption of said other switching position and being operative in response thereto to place said muting circuit means in said second condition.

19. Dictate station apparatus as in claim 17, wherein:

said switch apparatus has said first switching condition and additionally has second and third switching conditions, said second switching condition interconnecting said second circuit terminals to the dictation circuit and said third switching condition interconnecting third circuit terminals corresponding to a third message recording unit to the dictation circuits, said switch apparatus normally operative to maintain said first switching condition and being selectively operative in response to said first switching signal to assume said second switching condition and being further selectively operative in response to a second switching signal to assume said third switching condition;

said control circuit means being connected to receive said control signal from said control switch means and said busy signal conditions from each of said first, second, and third circuit terminals, said control circuit means being operative in response to the presence of a first busy signal condition at said first circuit terminal at a time when said control signal is received to apply said first busy signal condition to said switch apparatus to provide said first switching signal to operate said switch apparatus to said second switching condition; and said control circuit means being operative in response to the presence of a busy signal condition at both of said first and second circuit terminals at a time when a control signal is received to apply one of said busy signal conditions to said switch apparatus to provide said second switching signal to operate said switch apparatus to said third switching condition.

20. Dictate station apparatus as in claim 19, further comprising:

muting circuit means disposed in circuit between said dictation circuit and said switch apparatus, said muting circuit means selectively operative to a first condition preventing passage of signals between the dictation circuit and said switch means and to a second condition permitting such passage of signals;

muting control means operatively connected to selectively place said muting circuit means in either of said first or second conditions, said muting control means connected to receive said control signal and also said busy signal condition at said first circuit terminal and operative in response to the absence of said control signal to place said muting circuit means in said first condition, said muting control means operative in response to the presence of said control signal and the absence of a busy signal condition at said first circuit terminal to place said muting circuit means in said second condition.

21. Dictate station apparatus as in claim 20, wherein:

said muting control means is operative in response to the presence of a busy signal condition at said first circuit terminal at the time said control signal is received to maintain said muting circuit means in said first condition; and said muting control means is connected to receive a first signal from said switching apparatus indicating the assumption of said second switching position and to receive a second signal from said switching apparatus indicating the assumption of said third switching position, said muting control means being operative in response to the presence of said control signal and the occurrence of either of said first and second signals from said switching apparatus to place said muting circuit means in said second condition.

22. Dictate station apparatus as in claim 19, wherein:

said control circuit means comprises first, second, and third status circuits;

said first status circuit being connected to receive said control signal and a busy signal condition at said first circuit terminal and operative in response to the presence of a busy signal condition at said first circuit terminal and the absence of said control signal to apply a first priority signal condition to said second and third status circuits;

said second status circuit operative in response to said first priority signal condition to assume a first priority selection state and further operative when in said first priority selection state and in response to said control signal to apply said first circuit terminal busy signal condition as said first switching signal to said switch apparatus;

said second status circuit being further operative in response to a busy signal condition at said second circuit terminal at the time when said control signal is received to abstain from said priority selection state;

said third status circuit connected to receive said first priority signal condition and the busy signal conditions at said second and third circuit terminals and operative in response to the concurrent presence of said first priority signal condition from said first status circuit and a busy signal condition at said second circuit terminal to assume a second priority selection state, said third status circuit when in said second priority selection state being operative in response to said control signal to apply a busy signal condition from either said first or second circuit terminals as said second switching signal to said switch apparatus;

said third status circuit being additionally operative in response to a busy signal condition at said third circuit terminal to abstain from said second priority selection state.

23. Dictate station apparatus as in claim 22, further comprising:

muting circuit means disposed in circuit between said dictation circuit and said switch apparatus, said muting circuit means selectively operative to a first condition preventing passage of signals between the dictation circuit and said switch means and to a second condition premitting such passage of signals;

muting control means operatively connected to selectively place said muting circuit means in either of said first or second conditions, said muting control means being connected to receive said control signal, said first priority signal condition, and signals from said switching apparatus indicating the assumption of either of said second and third switching positions, said muting control means being operative in the absence of said control signal to place said muting circuit means in said first condition, said muting control means being additionally operative in response to the concurrent presence of said control signal and said priority signal to maintain said muting circuit means in said first condition until a signal is received from said switching apparatus indicating the assumption by said switching apparatus of either of said second and third switching positions.

* * * * *